(12) United States Patent
Squires et al.

(10) Patent No.: US 11,443,144 B2
(45) Date of Patent: Sep. 13, 2022

(54) STORAGE AND AUTOMATED METADATA EXTRACTION USING MACHINE TEACHING

(71) Applicant: MICROSOFT TECHNOLOGY LICENSING, LLC, Redmond, WA (US)

(72) Inventors: Sean Squires, Edmonds, WA (US); Mingquan Xue, Redmond, WA (US); Yuri Rychikhin, Bellevue, WA (US); Liming Chen, Redmond, WA (US); Nicholas Anthony Buelich, II, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 282 days.

(21) Appl. No.: 16/821,886

(22) Filed: Mar. 17, 2020

(65) Prior Publication Data

US 2021/0295104 A1  Sep. 23, 2021

(51) Int. Cl.
*G06F 16/00* (2019.01)
*G06K 9/62* (2022.01)
(Continued)

(52) U.S. Cl.
CPC ......... *G06K 9/6259* (2013.01); *G06F 16/176* (2019.01); *G06F 17/18* (2013.01); *G06N 20/00* (2019.01)

(58) Field of Classification Search
CPC ..... G06K 9/6259; G06F 16/176; G06F 17/18; G06F 16/367; G06F 16/35; G06N 20/00; G06Q 10/101
See application file for complete search history.

(56) References Cited

U.S. PATENT DOCUMENTS 7,739,218 B2  6/2010  Argueello et al.
9,547,650 B2 *  1/2017  Eyal ........................ H04L 67/42
(Continued)

FOREIGN PATENT DOCUMENTS

WO  2018142266 A1  8/2018

OTHER PUBLICATIONS

"Non Final Office Action Issued in U.S. Appl. No. 16/821,919", dated Jul. 19, 2021, 12 Pages.
(Continued)

*Primary Examiner* — Noosha Arjomandi
(74) *Attorney, Agent, or Firm* — Han Gim; Newport IP, LLC

(57) ABSTRACT

Techniques configuring a machine learning model include receiving, via a user interface configured to communicate with a machine learning model hosted on a collaborative computing platform, a selection of a file for input to the machine learning model, a selection of content in the file for input to the machine learning model, and instructions for applying the selected content to the machine learning model, which are sent to the machine learning model. As new files are uploaded to the selected directories of the collaborative computing platform, the machine learning model is applied to the uploaded files to classify the files and extract metadata. The extracted metadata and associated classification
(Continued)

data are stored in data structures associated with the new files. The data structures are existing data structures of the collaborative computing platform.

20 Claims, 10 Drawing Sheets

(51) Int. Cl.
  *G06N 20/00* (2019.01)
  *G06F 16/176* (2019.01)
  *G06F 17/18* (2006.01)

(56) References Cited

U.S. PATENT DOCUMENTS

| | | | | |
|---|---|---|---|---|
| 9,852,648 | B2* | 12/2017 | Wang | G09B 5/00 |
| 10,540,620 | B2* | 1/2020 | Torres | G06Q 10/06313 |
| 10,762,142 | B2* | 9/2020 | Puzicha | G06F 40/10 |
| 10,769,537 | B2* | 9/2020 | Boyer | G06F 16/3329 |
| 10,867,209 | B2* | 12/2020 | Coven | H04L 12/1831 |
| 10,885,463 | B2* | 1/2021 | Hansen | G06F 9/46 |
| 10,902,330 | B2* | 1/2021 | Boyer | G06N 5/04 |
| 11,023,104 | B2* | 6/2021 | Reynolds | G06F 3/0482 |
| 11,048,762 | B2* | 6/2021 | Puzicha | G06V 30/40 |
| 11,226,975 | B2* | 1/2022 | Patthak | G06F 16/248 |
| 2007/0043608 | A1* | 2/2007 | May | G06Q 10/10 705/7.29 |
| 2009/0030897 | A1 | 1/2009 | Hatami-hanza | |
| 2012/0072859 | A1* | 3/2012 | Wang | G06V 30/40 715/764 |
| 2016/0055426 | A1 | 2/2016 | Aminzadeh et al. | |
| 2016/0224516 | A1* | 8/2016 | Clar | H04N 1/387 |
| 2016/0292592 | A1* | 10/2016 | Patthak | H04L 41/16 |
| 2016/0350323 | A1* | 12/2016 | Suvorov | G06N 20/00 |
| 2018/0189597 | A1* | 7/2018 | Johri | H04L 67/22 |
| 2019/0005012 | A1 | 1/2019 | Priestas et al. | |
| 2019/0102098 | A1 | 4/2019 | Biswas et al. | |
| 2019/0108419 | A1* | 4/2019 | Coven | G06K 9/6289 |
| 2019/0155942 | A1 | 5/2019 | Tang et al. | |
| 2019/0179916 | A1 | 6/2019 | Sivaji et al. | |
| 2019/0325259 | A1* | 10/2019 | Murphy | G06V 20/41 |
| 2019/0392257 | A1 | 12/2019 | Foley et al. | |
| 2020/0050329 | A1 | 2/2020 | Maclean et al. | |
| 2020/0175416 | A1* | 6/2020 | Zhao | G06N 20/00 |
| 2021/0065320 | A1* | 3/2021 | Bleiweiss | G06F 40/134 |
| 2021/0174189 | A1* | 6/2021 | Guven Kaya | G06N 3/08 |
| 2021/0191957 | A1* | 6/2021 | Swamy | G06N 20/00 |
| 2021/0295104 | A1* | 9/2021 | Squires | G06F 16/176 |
| 2021/0295202 | A1* | 9/2021 | Squires | G06F 40/166 |
| 2021/0304063 | A1* | 9/2021 | Bulut | G06N 5/04 |

OTHER PUBLICATIONS

"International Search Report and Written Opinion Issued in PCT Application No. PCT/US21/015596", dated Apr. 12, 2021, 13 Pages.

Birzniece, et al., "Application of Interactive Classification System in University Study Course Comparison", In Informatics in Education, vol. 14, Issue 1, Apr. 13, 2015, pp. 13-34.

"International Search Report and Written Opinion Issued in PCT Application No. PCT/US2021/015347", dated May 18, 2021, 12 Pages.

Simard, et al., "Machine Teaching: A New Paradigm for Building Machine Learning Systems", In Repository of arXiv:1707 06742v3, Aug. 11, 2017, 14 Pages.

Wall, et al., "Using Expert Patterns in Assisted Interactive Machine Learning: A Study in Machine Teaching", In Proceedings of the IFIP Conference on Human-Computer Interaction, Aug. 25, 2019, pp. 578-599.

Berry, et al., "What is Language Understanding (LUIS)?", Retrieved from: https://docs.microsoft.com/en-us/azure/cognitive-services/luis/what-is-luis, Nov. 22, 2019, 8 Pages.

Maadarani, Mike, "Building an FAQ Chatbot in SharePoint", Retrieved from: https://www.maadarani.com/building-an-faq-chatbot-in-sharepoint/, Mar. 30, 2019, 11 Pages.

Patton, Seth, "Introducing Project Cortex", Retrieved from: https://techcommunity.microsoft.com/t5/Microsoft-365-Blog/Introducing-Project-Cortex/ba-p/966091, Nov. 4, 2019, 20 Pages.

Wells, Joyce, "Iron Mountain Announces Cloud-Based Content Services Platform Powered by Google Cloud's AI and Machine Learning", Retrieved from: https://www.kmworld.com/Articles/ReadArticle.aspx?ArticleID=127934, Oct. 11, 2018, 4 Pages.

"Form Recognizer", Retrieved from: https://web.archive.org/web/20190504035000/https://azure.microsoft.com/en-us/services/cognitive-services/form-recognizer/, May 4, 2019, 24 Pages.

"Text Analytics API documentation", Retrieved from: https://docs.microsoft.com/en-us/azure/cognitive-services/text-analytics/. Retrieved Date: Dec. 4, 2019, 5 Pages.

Langston, Jennifer, "Machine teaching: How People's Expertise makes AI even more Powerful", Retrieved from: https://blogs.microsoft.com/ai/machine-teaching/?ranMID=43674&ranEAID=je6NUbpObpQ&ranSiteID=je6NUbpObpQ-a2cUSbBbj8eAL6gBOe1C3w&epi=je6NUbpObpQ-a2cUSbBbj8eAL6gBOe1C3w&irgwc=1&OCID=AID681541_aff_7795_1243925&tduid=, Apr. 23, 2019, 11 Pages.

"Final Office Action Issued in U.S. Appl. No. 16/821,919", dated Jan. 14, 2022, 12 Pages.

"Notice of Allowance Issued in U.S. Appl. No. 16/821,919", dated May 11, 2022, 9 Pages.

* cited by examiner

Getting Started

Add Files

| | |
|---|---|
| File Name | Name |
| Month | Nov-2018 |
| Training Type | Content type classifier |
| User | Dxxanu |
| Subscription | f46465sggg4546h5657 |

File Classification

| | |
|---|---|
| File Type | Type |

Target Library: Library | Type

Publish Model

| Library | Project | Target URL |
|---|---|---|
| Prime | Project | |
| Prime | Project | https://site.com/sites/content |
| CCC | Project | |

[Publish] [Cancel]

File Classification

Date: 2018-09   Select scenarios: MOD-201807 ▼   Original× Scenario1× Scenario2×

Project Impact

File Extraction

| Overall Project Status | Actual | Confidence |
|---|---|---|
| Margin | 98% | 99% |
| Files | 56 | 100 |

Model Teaching Files

| File Name | History | | Data | |
|---|---|---|---|---|
| | Created | Modified | Info | Info |
| file1 | xx/xx/xxxx | xx/xx/xxxx | yyyyyy | 17% |
| file2 | xx/xx/xxxx | xx/xx/xxxx | yyyyy | 20% |
| file3 | xx/xx/xxxx | xx/xx/xxxx | yyyyy | 18% |
| file4 | xx/xx/xxxx | xx/xx/xxxx | yyyyy | 12% |
| file5 | xx/xx/xxxx | xx/xx/xxxx | yyyyy | 15% |
| file6 | xx/xx/xxxx | xx/xx/xxxx | yyyyy | 12% |
| file7 | xx/xx/xxxx | xx/xx/xxxx | yyyyy | 17% |
| file8 | xx/xx/xxxx | xx/xx/xxxx | yyyyy | 12% |
| file9 | xx/xx/xxxx | xx/xx/xxxx | yyyyy | 17% |
| file10 | xx/xx/xxxx | xx/xx/xxxx | yyyyy | 22% |
| file11 | xx/xx/xxxx | xx/xx/xxxx | yyyyy | 17% |

FIG. 6

STORAGE AND AUTOMATED METADATA EXTRACTION USING MACHINE TEACHING

BACKGROUND

Some computing platforms provide collaborative environments that facilitate communication and interaction between two or more participants. For example, organizations may utilize a document management and collaboration system to enable users to share documents and collaborate on the documents.

A number of documents may be generated and developed by users of the collaborative environment. Finding documentation, past or present, about a selected topic can be time consuming and difficult if not impossible. Tagging documents to enable subsequent searching can be performed but can be time consuming and inconsistent. Manually configuring documents and ensuring reliable, consistent tagging of uploaded contents is a significant challenge.

These shortcomings can be inconvenient for users and cause significant inefficiencies with respect to the utilization of computing resources. For example, opening multiple documents to view and search for a particular context can result in the inefficient utilization of processor cycles, memory, battery power, and network bandwidth. The inability to find relevant content can lead to significant rework and delays, as well as inefficiencies that can result in erroneous or incomplete deliverables.

It is with respect to these and other technical challenges that the disclosure made herein is presented.

SUMMARY

The present disclosure describes various embodiments for implementing a machine teaching model on a computing platform configured to provide a collaborative environment. Machine teaching is a supervised learning methodology that leverages the knowledge and experience of users rather than just the data. Machine teaching further requires fewer documents than traditional machine learning and may be applied using sample data without existing labels.

In some embodiments, an abstracted user interface may be configured to implement tools for generating a machine teaching model for data objects that are hosted on the computing platform. The abstracted user interface enables a user to use natural language text to generate input for training the model using a small set of unlabeled sample data that is stored on the computing platform. For example, the user interface may be configured to provide an intuitive interface and familiar interaction patterns to upload sample documents, view the contents of the documents to identify and explain concepts, and validate the model when the platform applies the teachings for labeling new content. In one embodiment, unsupervised and supervised training may be implemented where a model and content type (e.g., a document class with a defined schema) are generated from sample documents and used to automate the labeling and classification of similar documents.

Automated classification of document classes and extraction of entities in these files can be difficult and prone to error, and may further require considerable expertise and time to build an accurate machine learning application. The disclosed user interface may avoid the complexities of programming a machine teaching model and the need to utilize AI expertise, thus making accessible the use of such techniques for a wide variety of applications. For example, users may generate a model with no labeled data and with one subject matter expert.

The disclosed user interface provides an intuitive approach to train the machine teaching model to recognize entities and concepts and automatically apply the entities and concepts to new platform content. The user interface may allow for improved productivity by reducing the time and manual effort to tag and label large sets of content stored on the platform. Additionally, the disclosed user interface may improve the discovery and retrieval of indexed content due to facilitation of consistent labeling protocols. The user interface may further facilitate the automation of processes by the use of automated classification of uploaded content to the platform. For example, metadata extraction from select file formats may be automated, and the new machine learning services and capabilities may facilitate auto-labeling and classification applications into the content management flow of the platform.

In some embodiments, the user can elect to build a model to extract select name-value pairs from forms and write the data back to the associated library on the platform. After the samples are scanned and fields identified, a user may map fields to new or existing categories on the platform. In an embodiment, once the model is published the model can be run when a new file event is triggered (e.g., (create or upload).

The disclosure further describes ways to integrate a machine teaching model with a computing platform such as a data hosting platform. The trained model and associated sample data may be published using existing data structures of the platform, without the need for a separate artificial intelligence (AI) platform. The trained and published model enables intelligent libraries of data. As new data is uploaded to the data hosting platform, the data may be classified, and key metadata may be extracted and written directly to the existing data structures. The intelligent libraries enable immediate and continuous visibility into the stored content that in turn enables various data mining and discovery processes. Additionally, the data and model are hosted in the same tenant space, so the data never leave the tenant's online space.

By providing the intuitive user interface and integrated platform for implementing a machine teaching model on a computing platform, users may apply custom machine-learning features using the user's natural language text to predict and analyze documents. This may be integrated directly in the platform, enabling subject matter experts to generate models using a small set of unlabeled sample files and publish the models to selected portions of the platform. When files are subsequently uploaded to the platform, the published models may be used to classify the files, extract values, and write the values to fields in existing data structures associated with the files. This automated metadata capture capability can provide greater efficiencies in productivity as well as ensure consistent tagging of content that can support data discovery, process automation, and compliance with security and retention policies.

For example, some platforms may implement lists where data is stored in rows, and each row is considered a list item. A list can have multiple columns that can be referred to as properties, fields, or metadata. In some embodiments, a list item may be used to store model/label/feature/schema needed for the machine teaching metadata. Automated processes can be used to extract data and classify files that are uploaded to the platform.

The described embodiments can increase the efficiency and productivity of computing platforms, allowing for users to efficiently generate machine teaching models that can enable automated extraction and classification of unstructured content (e.g. forms, documents, images, videos). The techniques disclosed herein can improve user interaction with a computing device, which can increase a user's productivity and help reduce the number of inadvertent, obsolete, or otherwise incorrect inputs. Also, by providing more accurate and more contextually relevant information, a system can operate more efficiently with respect to the use of memory, processing resources, network resources, etc. Having more accurate and more contextually relevant data can reduce the number of emails and other forms of communication that may be used to clarify and correct inaccurate information. Other technical effects other than those mentioned herein can also be realized from implementations of the technologies disclosed herein.

BRIEF DESCRIPTION OF THE DRAWINGS

The Detailed Description is described with reference to the accompanying figures. The same reference numbers in different figures indicates similar or identical items. References made to individual items of a plurality of items can use a reference number with a letter of a sequence of letters to refer to each individual item. Generic references to the items may use the specific reference number without the sequence of letters.

FIG. 6 illustrates an example interface for updating models.

DETAILED DESCRIPTION

Figure 1:
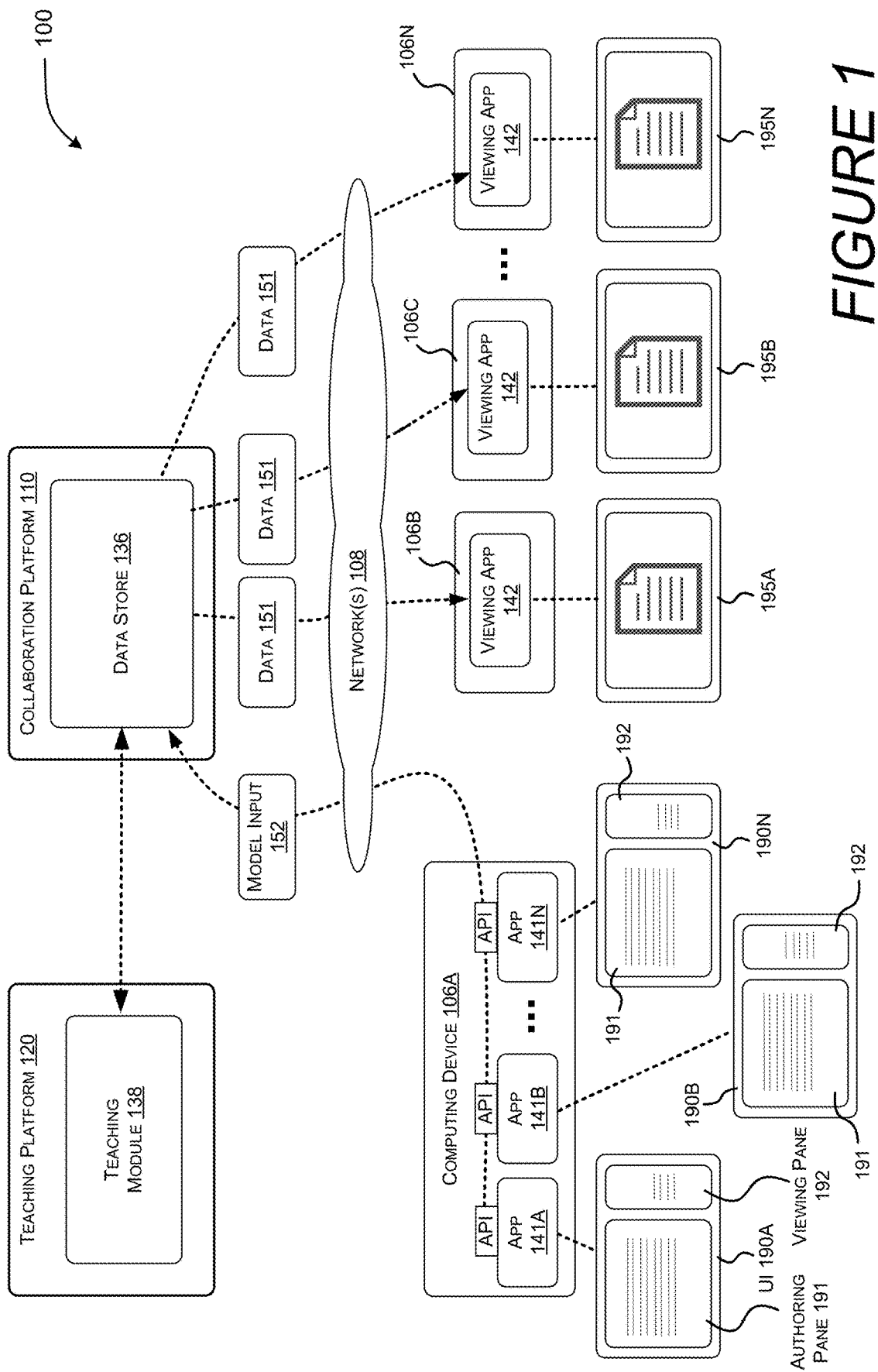
FIG. 1 illustrates a diagram illustrating a system for generation and of machine teaching models according to various embodiments.

Described herein are various embodiments for enabling efficient integration of a machine teaching model with a computing platform configured to provide a collaborative environment. Such a computing platform may include Microsoft SharePoint. The integration of an artificial intelligence (AI) capability may enable efficiencies and features in the collaborative environment such as the automation of classification of content and extraction of metadata, which in turn can improve content discovery, process automation, and consistent governance.

In one embodiment, an integrated and abstracted machine teaching user interface is provided to facilitate the building of classifier and/or extractor models using existing content as training files through an interactive and iterative user experience. Machine teaching is a supervised learning methodology that leverages the knowledge and experience of users in addition to input data. Machine teaching further requires fewer documents than traditional machine learning and may be applied using sample data without existing labels.

In various embodiments, the abstracted user interface implements tools for generating a machine teaching model for data objects that are hosted on the computing platform. The abstracted user interface may be configured to allow a user to use natural language text to generate input for training the model using a small set of unlabeled sample data that is stored on the computing platform. For example, the user interface may be configured to provide an intuitive interface and familiar interaction patterns to upload sample documents, view the contents of the documents to identify and explain concepts, and validate the model when the platform applies the teachings for labeling new content. In one embodiment, unsupervised and supervised training may be implemented where a model and content type are generated from sample documents and used to automate the labeling and classification of similar documents.

In some embodiments, the computing platform may be configured to run newly created or uploaded content through one or more trained models to automatically identify and extract content. After contents are extracted, the extracted content may be applied to mapped fields.

Some computing platforms organize content using libraries. A library may be a location where users can upload, create, update, and collaborate on files with members of a group. A trained model may be applied to a library or multiple libraries. Files within a library may be associated with metadata that are based on a model, including a model name, content type, and a confidence score indicative of the training and runtime accuracy of correctly extracting and labeling files. In some embodiments, a model library may be implemented where models are referenced and used at runtime to extract metadata defined in the model. The platform may also host libraries for content that use the models in the model library at runtime.

In some embodiments, a character or a string may be used to explain a pattern. Dictionary explanations can also be used to describe a pattern or character sequence. For example, a date pattern for a sequence may be described as 1/11/1111. A proximity explanation may describe a pattern that connects together dictionary, proximity or pattern, or other features. For example, a string can be selected as "as of" and an explanation for a date and punctuation mark (e.g., "As of 9/24/2019, our . . . ") can be a phrase pattern. As another example, another extractor may be used as an explanation. For example, a general extractor date may be defined and a context extractor with additional proximity explanations can be defined to identify a specific date string from a document.

After labeling a set of files with explanations, the model can be tested. If no errors are found during training, the user interface may indicate that the model is ready for publication and used to identify and extract strings that meet the criteria using the model label definitions. If an error is detected, the status can be indicated on the user interface and the predicted text can be shown to not match the identified labels. The user interface may allow the user to amend the inputs with more samples, add more explanations to the classifier model, and edit the previously created extractors. The model may find false positives where model confidence is low and false negatives where confidence is low.

In some embodiments, the user interface may include options for selecting training types such as a content type classifier. Previously created extractors can be used as features in a classifier model and can be used as positive samples in training. The user interface may further provide positive and negative training inputs that define what the concept does and does not include. The extractors that are defined using the user interface may be mapped to new or existing metadata in the computing platform.

In some embodiments, as subsequent training documents are opened, the user interface may suggest concepts based on the concepts and extractors previously defined. The interface may include a confidence score to indicate when the model can be validated and published. The user interface may provide a publishing action so that the model can be applied to a model library and associated with one or more user libraries.

In one example, a user may desire to automate the metadata collection for a library for a project. The user may want to capture specific elements of an RFP document such as questions that each party must answer and selected details such as timeline, cost, and processes. The user may open the user interface to create a new teaching process. The user interface may allow the user to identify the types of documents to train and allow the user to upload sample documents.

Continuing with the example, once the documents are uploaded, the user may select an uploaded document within a viewer where the user can manually highlight and label the various concepts and metadata that the user wants to capture into library columns. As the user highlights a text fragment, the user may map the fragment to an existing site column or create a new column. The designated site columns may be grouped into a content type defined in the model.

For each document, the defined fields may be populated and the user may select whether the populated fields meet the criteria as positive or negative. The user may also correct the field if the field is incorrect. The user may also skip a field and postpone its evaluation. After the user completes the evaluation, the user may submit the evaluation and move on to the next document, repeating this process until the user is satisfied with the results and confidence scoring. The user typically teaches one concept/entity (field of metadata to extract) at a time for a set of training files.

As the user moves through the sample documents, the user interface may generate suggestions by highlighting concepts in each opened document. The user can review and confirm or correct these suggestions, further refining the model. The user interface may further update an information panel to provide both the confidence score and whether a sufficient set has been labeled and trained.

When the user is satisfied with the model, the user may publish the model, which writes the newly created or updated content type to a selected library. The user may test the model in the selected library or proceed with training another model. Every document uploaded to the selected library may be classified by the content type and extracted with metadata using the model.

By defining one or more models using the described process, users of the computing platform may be provided with efficient capabilities to organize content such as lists and libraries. The content may be configured with shared columns and/or content types, leveraging the defined taxonomy for consistency, generate flows for rules-based actions, and execute applications for custom processes. Furthermore, models can be reused or used as templates to easily create new models. Active models can be activated in libraries on the computing platform to continuously capture and populate metadata fields or columns.

Libraries on the computing platform may include a training library that may be used for uploading samples for building a model. A model library may be used to store models. The user interface may be used to monitor and audit model usage and health. A primed library may be an active library that has been connected to a published model. A primed library may include constructed content types and views created when building the associated model. The user interface may include a custom view for tagged files that may require user attention based on low confidence scores. Labeled content may include any files that have been tagged by a user or through use of a model.

In an embodiment, a computing environment that implements the described techniques may be implemented using one or more components. In one embodiment, the components may execute on the same physical computing device. In other embodiments, the components may be distributed, for example in a client-server architecture.

FIG. 1 illustrates a system 100 for enabling the generation, storage, and updating of models from applications 141. In some embodiments, updating or creation of models may be enabled within a contextual environment of an application such as a word processing application. In other embodiments, the updating or creation of models may be enabled using a separate user interface application. Either embodiment may be illustrated by application 141 in this example. A user can interact with an application 141 to create and edit models, and view and add or edit content that may be a particular type of file, e.g., a word processing document, a spreadsheet document, etc. The applications 141 may each be configured to display a teaching pane 191 and a viewing pane 192. The content of a model may be displayed in the teaching pane 191. A user can select portions of content displayed in the teaching pane 191. The selected portions can be selected as model inputs in a viewing pane 192. The viewing pane 192 may also be used to view available files for selection and insertion into the model.

The content in the viewing pane 192 can be used to generate model input 152. In some configurations, the model input 152 can be in the form of a text strings, table, file, an image file, a video file, or any other suitable format. Collaboration platform 110 and teaching platform 120 can interact to identify and classify content based on the generated models. Although collaboration platform 110 and teaching platform 120 are shown as two platforms, collaboration platform 110 and teaching platform 120 may be implemented as a shared platform. For example, teaching platform 120 can be part of collaboration platform 110 and vice versa.

Model input 152 can include text, images, media or any other form of data. The model input 152 can include data that is stored within a data store 136 and managed by teaching platform 120 comprising a teaching module 138.

Data 151 can be communicated to any number of computing devices 106, referred to herein as computing devices 106B-106N, from a first computing device 106A or the service 110 via a network 108. Each computing device 106B-106N associated with a recipient can display the data 151 on a user interface 195 (195A-195N) by the use of a viewing application 142. The viewing application 142 can be any suitable application such as a presentation program, a web browser, a media player, etc. The viewing application 142 may also be a web-based application.

It should be appreciated that the subject matter described herein may be implemented as a computer-controlled apparatus, a computer process, a computing system, or as an article of manufacture such as a computer-readable storage medium. Among many other benefits, the techniques shown herein improve efficiencies with respect to a wide range of computing resources. For instance, human interaction with a device may be improved, as the use of the techniques disclosed herein enable a user to view and edit model input data from a wide range of file types while operating in one application. In addition, improved human interaction improves other computing resources such as processor and network resources, e.g., users can work from a reduced number of applications and reduce a user's computer interaction, reduce the chances of an inadvertent input, reduce network traffic, and reduce computational cycles. The techniques disclosed herein reduce the need to download, start, maintain updates for, and toggle between, a number of applications, including a specialized presentation program. Also, instead of requiring the input of machine learning experts, useful machine learning applications can be generated using the abstract user interface by users of the data. Other technical effects other than those mentioned herein can also be realized from implementations of the technologies disclosed herein.

The collaboration platform 110 may enable the devices 106 to share documents and collaborate on the documents. As described herein, the term "user" may refer to a computing device that is equipped with communication and computing capability. The term "document" may be any type of media, such as text documents, that is capable of being rendered on a computing device. A document may be a computer file that is capable of being produced by, edited, or viewed using a productivity program or suite. In addition to enabling users to collaborate and share documents, the collaboration platform 110 may provide users with file systems or organizational structures to manage the documents. The collaboration platform 110 may include a task management and workflow service as well as other services not illustrated in FIG. 1.

The collaboration platform 110 may require authorization or user authentication before granting access to the resources of the collaboration platform 110. The collaboration platform 110 may enable users to execute applications or tasks, track and manage the execution of the applications or tasks, and receive the results of the execution. The collaboration platform 110 may enable and manage the execution and processing of documents for collaboration between one or more users in a distributed system. The collaboration platform 110 may, for example, enable uploading documents and retain and modify metadata associated with the documents. The collaboration platform 110 may further allow for search functions associated with the documents or their metadata as well as collaborations between users on the documents.

The data store 136 may be a collection of computing resources configured to process requests to store and/or access data. The data store 136 may operate using computing resources (e.g., databases) that enable the data store 136 to locate and retrieve data so as to allow data to be provided in response to requests for the data. Data stored in the data store 136 may be organized into data objects. The data store 136 may store any type of document (for example, document source files), extracted document text, and the like.

The UI 190 may be configured to allow the creation and editing of models as described herein. The UI 190 may enable the user (not shown) to view and edit model input 152 for a selected model. In some embodiments, UI 190 may communicate via API function calls.

The teaching platform 120 may be a collection of computing devices and other resources collectively configured to enable creation and editing of models. Models may be generated by creating a library or associating an existing library.

The application 141 may be implemented by executable instructions (for example, that are stored on a non-transitory computer-readable storage medium on the computing device 106 or coupled to the computing device 106) that, when executed by the computing device 106, enable user interaction with the UI 190. A user may also interact collaboration platform by, for example, uploading a document to one or more libraries, opening a document from one or more libraries, and editing or annotating a document.

In one embodiment, teaching platform 120 may be configured to manage and store user-created models. Teaching platform 120 may allow for modifications to a model. The teaching platform 120 may be remotely implemented such as on a server, or may be implemented on one or more devices. The UI 190 may read and/or write data to the teaching platform 120 over a network 108. In some implementations, the schema of the model may include a column containing a list of who has access rights. The access rights may indicate, for example, that only an authenticated user such as BobSmith@Contoso.com and FredJacoby@Contoso.com may access the data. APIs may also be exposed to allow users to request or retrieve relevant models, such as those that the users have access to or are engaged with because of a shared task or project. In some embodiments, versioning may be implemented to allow different versions of a model.

Figure 2:
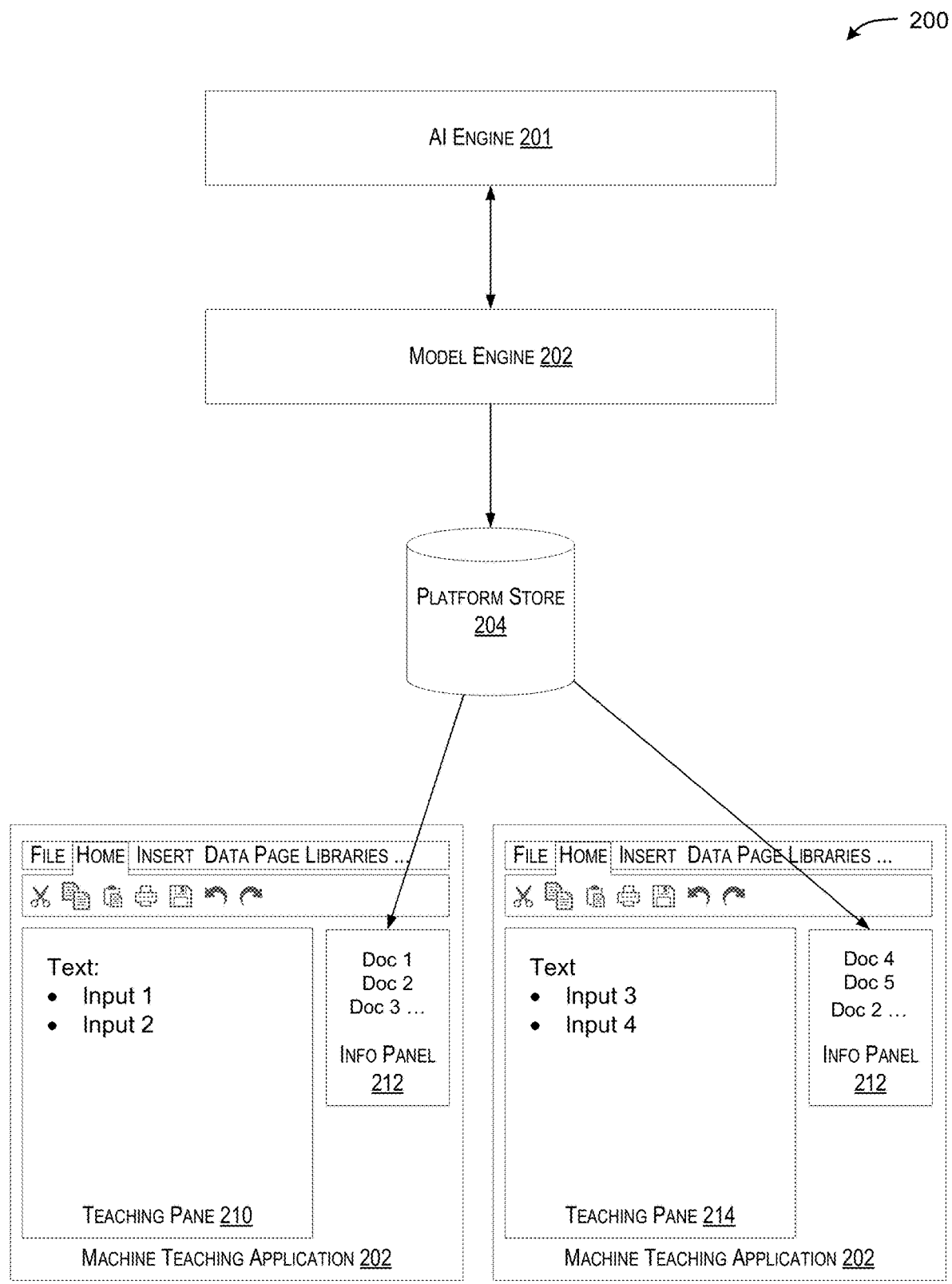
FIG. 2 illustrates a block diagram for identifying files and providing them to a model.

FIG. 2 illustrates a block diagram 200 for creating and editing models in accordance with the disclosure. In some embodiments, platform store 204 may include documents, emails, spreadsheets, presentations, graphics files, and the like. These documents may be accessed via a network by model engine 202. Model engine 202 may receive various files, including metadata associated with the files, to associate files with metadata and related data. In some embodiments, files may be stored in platform store 204, which may be implemented by a storage service.

In some embodiments, files stored in platform store 204 may be retrieved by software applications, such as machine teaching application 202. These applications may be configured to include teaching panes 210 and 214 in which document content is displayed. Applications 202 also include information panels 212. In some embodiments, the information panels 212 may list files that are available, files that have been added to the model, confidence scores, whether a sufficient set has been labeled/trained, and other information.

Figure 3:
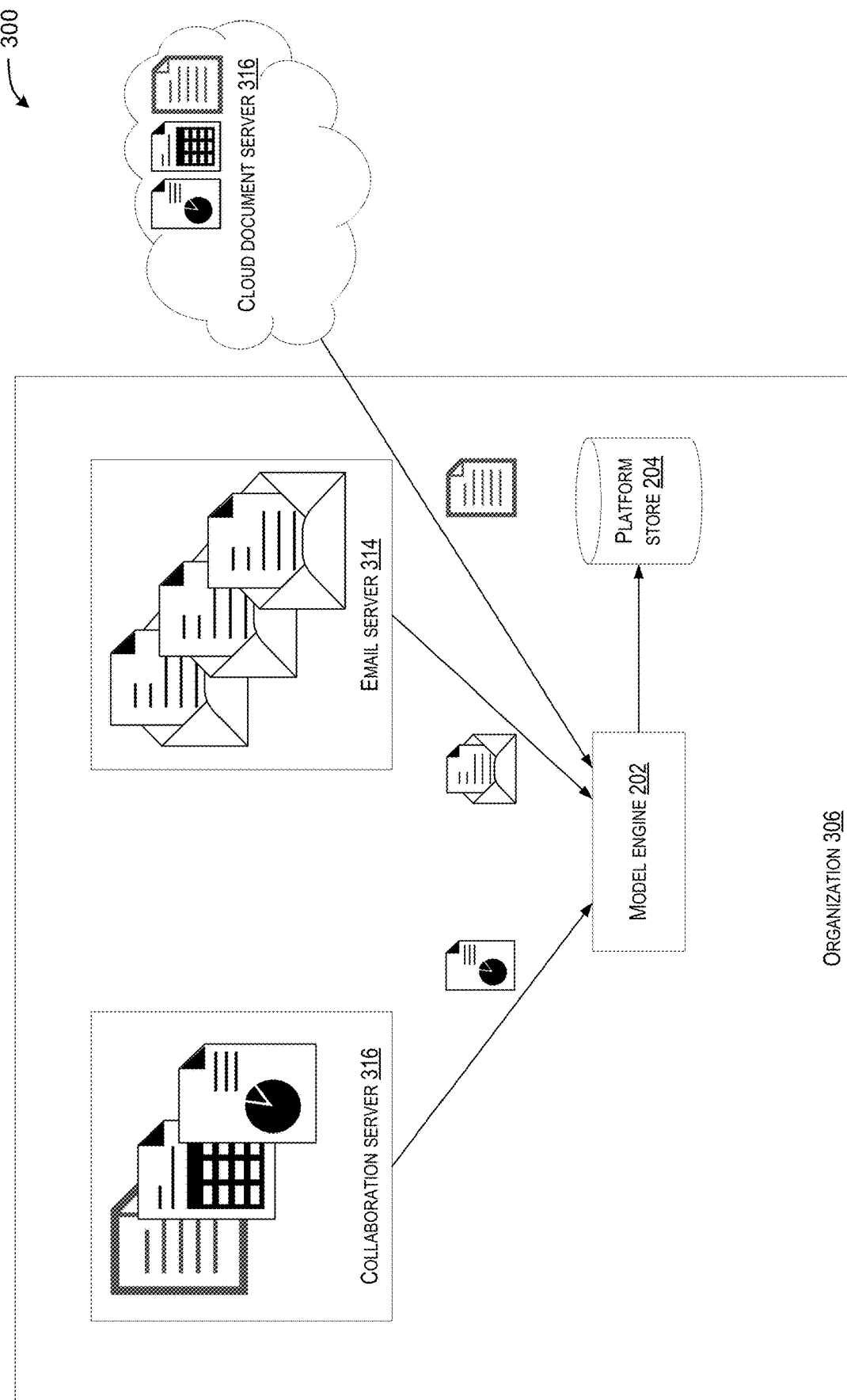
FIG. 3 illustrates a block diagram for generating models in an organization.

FIG. 3 illustrates a block diagram 300 for generating, editing, storing, and re-using models in conjunction with a team or organization 306. In some embodiments, model engine 202 receives files to be processed from collaboration server 316, email server 314, cloud document server 316, or the like. In some embodiments, the files stored on these servers are associated with organization 306. This enables files to be identified that are particular to organization 306.

For example, collaboration server 316 may store slide presentations, spreadsheets, word processing documents, emails, calendar appointments, or the like. In some embodiments, model engine 202 may have access to retrieve the documents stored in collaboration server 316. Additionally or alternatively, collaboration server 316 may provide stored documents to model engine 202. Model engine 202 may also be implemented as an add-in executing within collaboration server 316.

Model engine 202 may similarly receive artifacts from email server 314. These artifacts may include emails, attachments, or any other type of document. In some embodiments, while cloud document server 316 exists physically outside of organization 306, the documents contained thereon may still be considered part of the organization.

Figure 4:
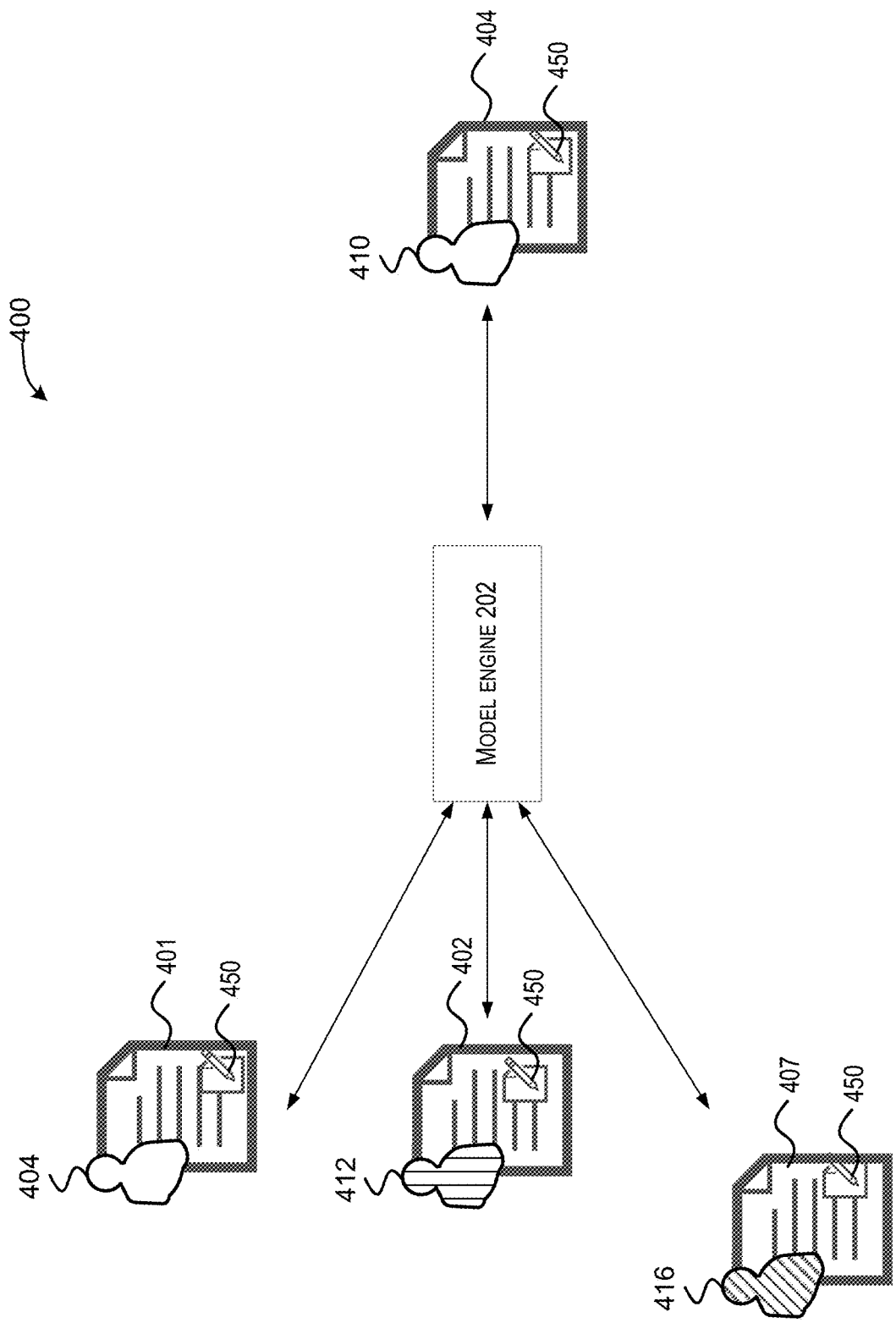
FIG. 4 illustrates a block diagram for updating models.

FIG. 4 illustrates a block diagram 400 showing how a model may be updated by various users and how results of publishing a model may be provided to users. In some embodiments, model engine 202 is configured to track a model 450 that has been trained using data in document 401, document 402, document 404 and document 407. These documents have associated users 404, 410, 412, and 416.

In some embodiments, when document 402, document 404, or document 406 are updated, or when their model 450 is updated, the updates may be received by model engine 202 and document 402, document 404, and document 406 may each be analyzed to determine if any updates were made to the file.

Figure 5:
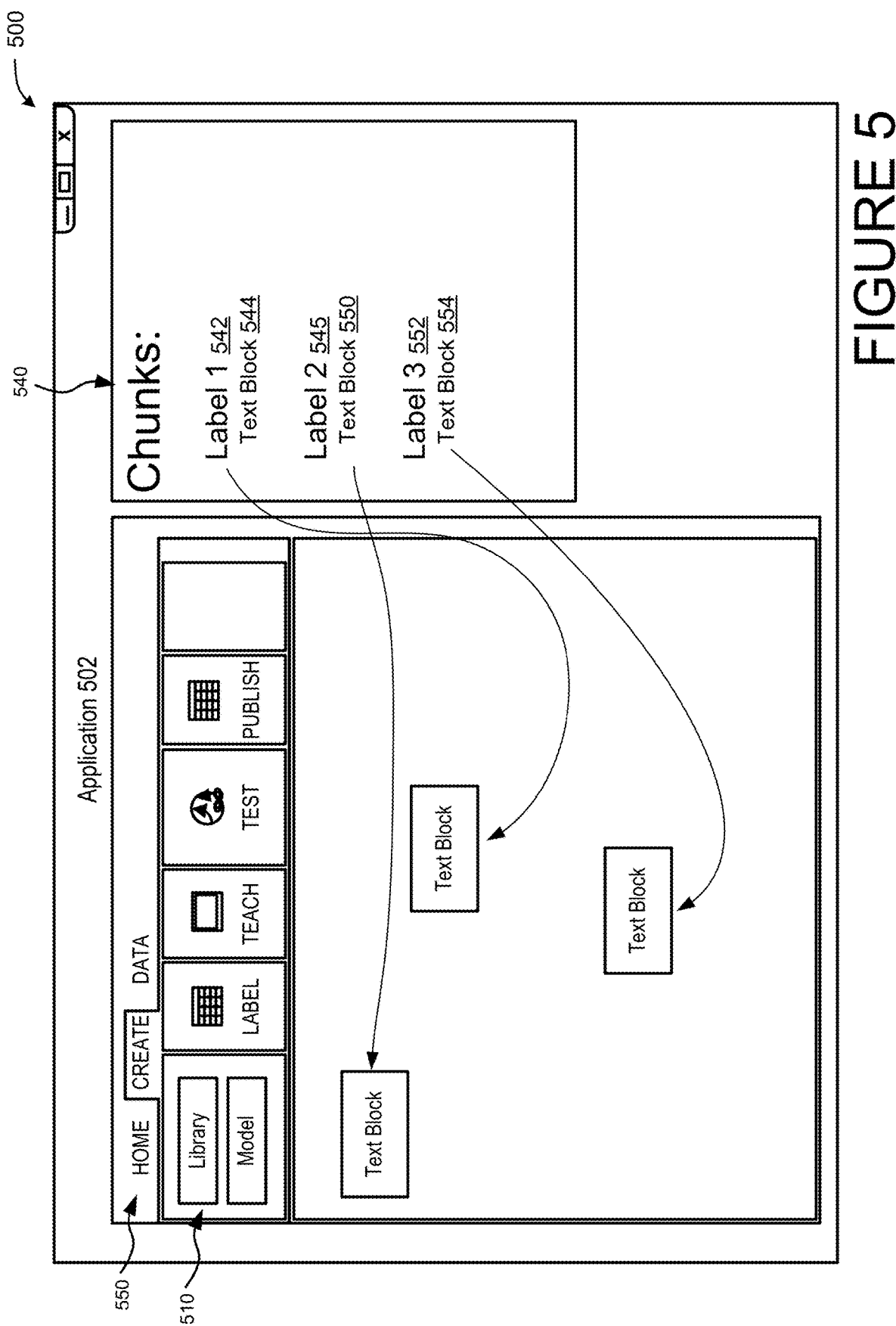
FIG. 5 illustrates an example interface for updating models.

FIG. 5 shows a document-based teaching user interface 500 including a teaching application 502 with information panel 540 for labels that are identified in the document. In one embodiment, application 502 executes on a computing device and is rendered on a display device, and includes a menu 510 and a document panel 550. Information panel 540 lists three text blocks 544, 550, and 554 in the document that are identified as label 1 542, label 2 545, and label 3 552, with arrows associating the labels with their corresponding text blocks.

FIG. 6 illustrates an example user interface 600 that incorporates various aspects of the present disclosure.

Figure 7:
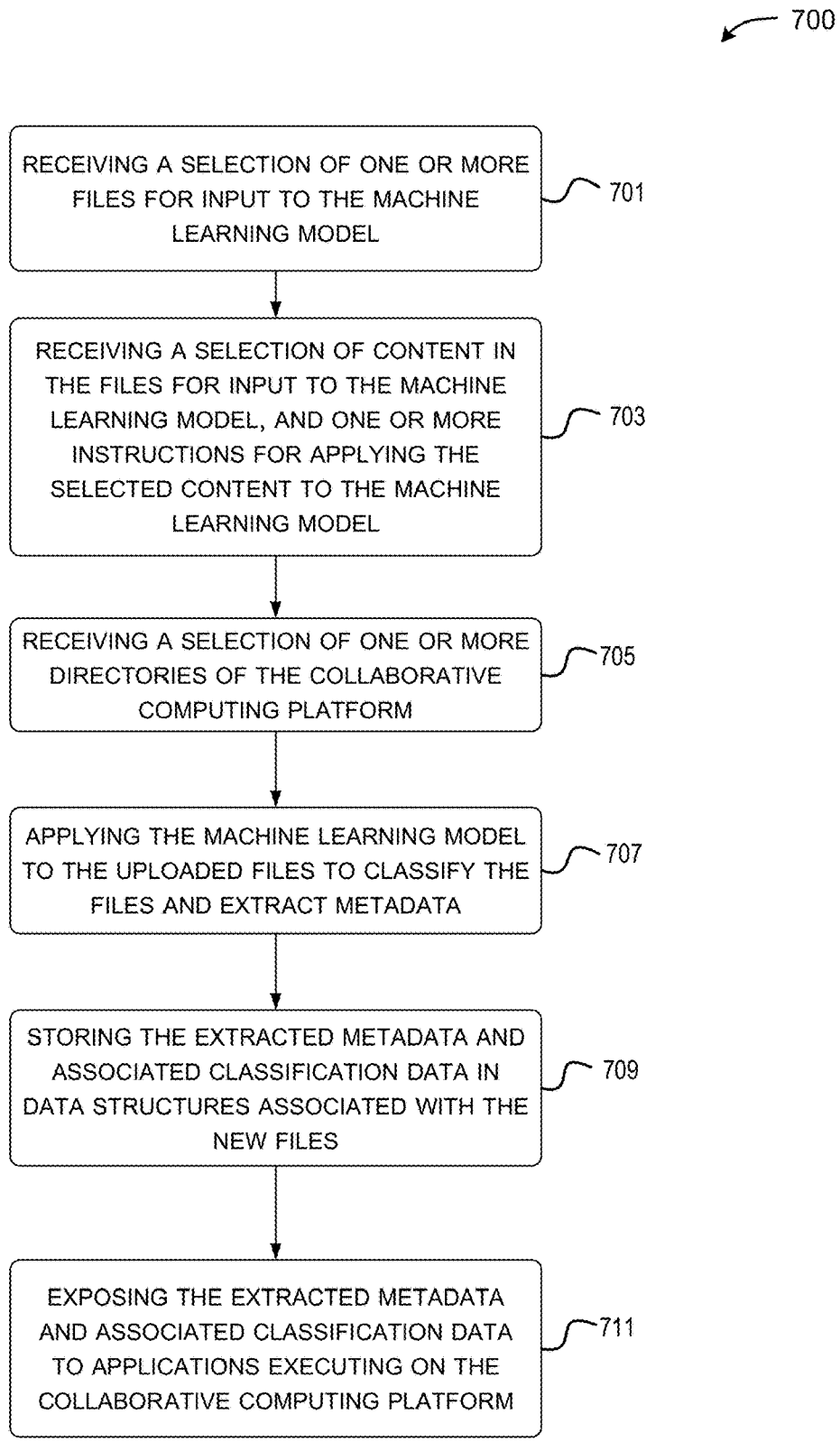
FIG. 7 illustrates aspects of a routine for enabling aspects of the techniques disclosed herein as shown and described below.

FIG. 7 illustrates aspects of a routine 700 for enabling aspects of the techniques disclosed herein as shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 700 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 700 may be also implemented in many other ways. For example, the routine 700 may be implemented, at least in part, by a processor of another remote computer or a local circuit. In addition, one or more of the operations of the routine 700 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 9:
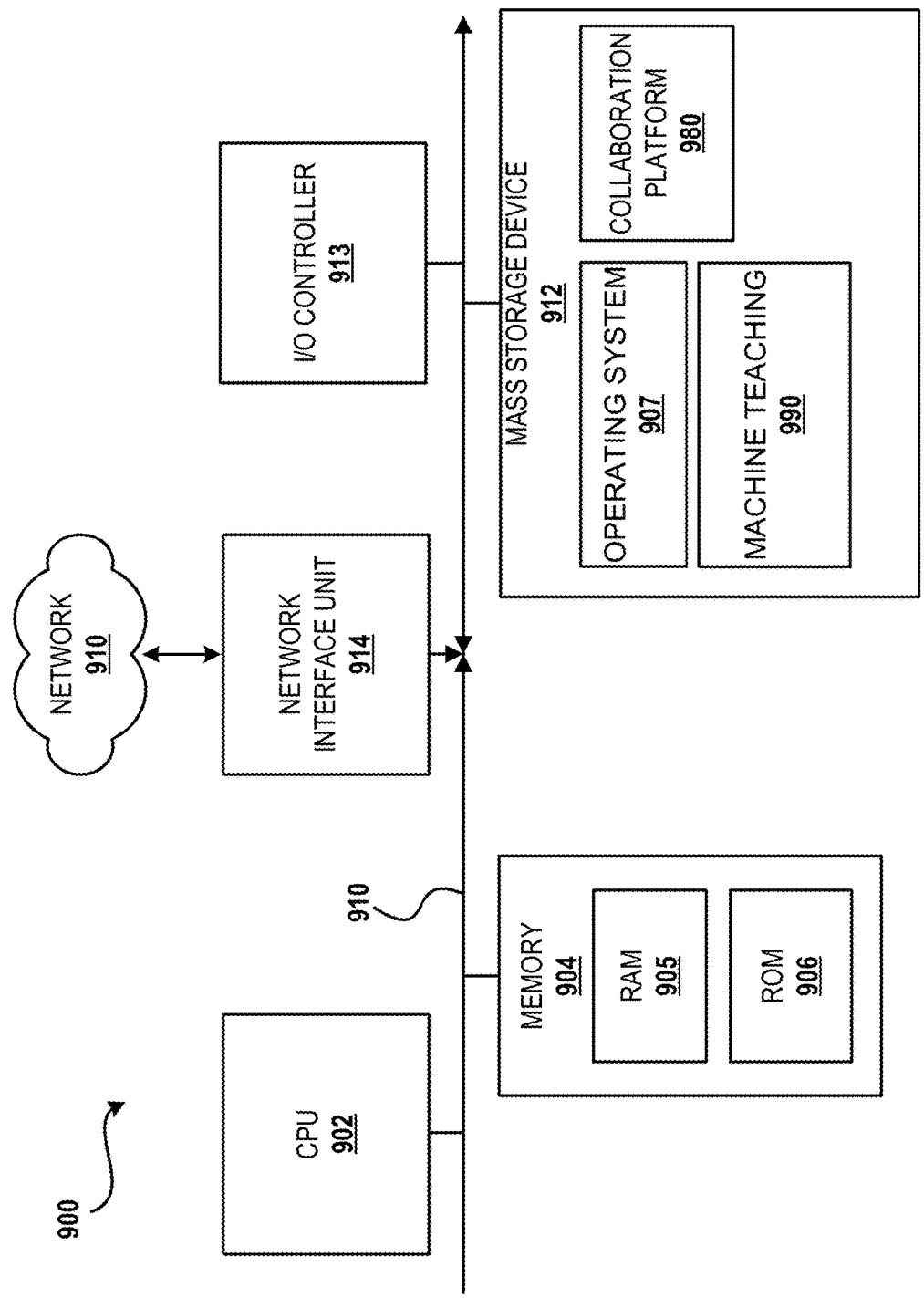
FIG. 9 is a computer architecture diagram illustrating an illustrative computer hardware and software architecture for a computing system capable of implementing aspects of the techniques and technologies presented herein.

The operations in FIG. 7 can be performed, for example, by the computing device 900 of FIG. 9, as described above with respect to any one of FIGS. 1-6.

At operation 701, a selection of one or more files for input to the machine learning model is received via a user interface configured to communicate with the machine learning model. In an embodiment, the files are stored on the collaborative computing platform.

At operation 703, a selection of content in the files for input to the machine learning model, and one or more instructions for applying the selected content to the machine learning model are received via the user interface.

At operation 705, a selection of one or more directories of the collaborative computing platform is received.

At operation 707, as new files are uploaded to the selected directories of the collaborative computing platform, the machine learning model is applied to the uploaded files to classify the files and extract metadata.

At operation 709, the extracted metadata and associated classification data are stored in data structures associated with the new files. In an embodiment, the data structures are existing data structures of the collaborative computing platform.

At operation 711, the extracted metadata and associated classification data are exposed to applications executing on the collaborative computing platform.

At operation 713, in response to selection of the first option, additional inputs to the machine learning model is received by the user interface.

At operation 715, in response to selection of the second option, a selection of one or more directories of the collaborative computing platform is received; and an instruction is sent to the machine learning model to apply the machine learning model to the selected directories.

In some embodiments, the machine learning model is trained using the selected file, selected content, and instructions; and the trained machine learning model is operable to generate outputs based on the selected directories as input data.

In some embodiments, the machine learning model implements a machine teaching paradigm.

In some embodiments, the files comprise documents containing text.

In some embodiments, the selected directories are libraries configured to host files associated with selected users of the collaborative computing platform.

In some embodiments, the extracted metadata and associated classification data are compiled to maintain running statistics for the selected directories.

In some embodiments, the data structures comprise columns of the libraries.

In some embodiments, the applications comprise one or more of data discovery, business process, or compliance applications.

In some embodiments, the metadata comprises one or more of model, label, feature, or schema.

Figure 8:
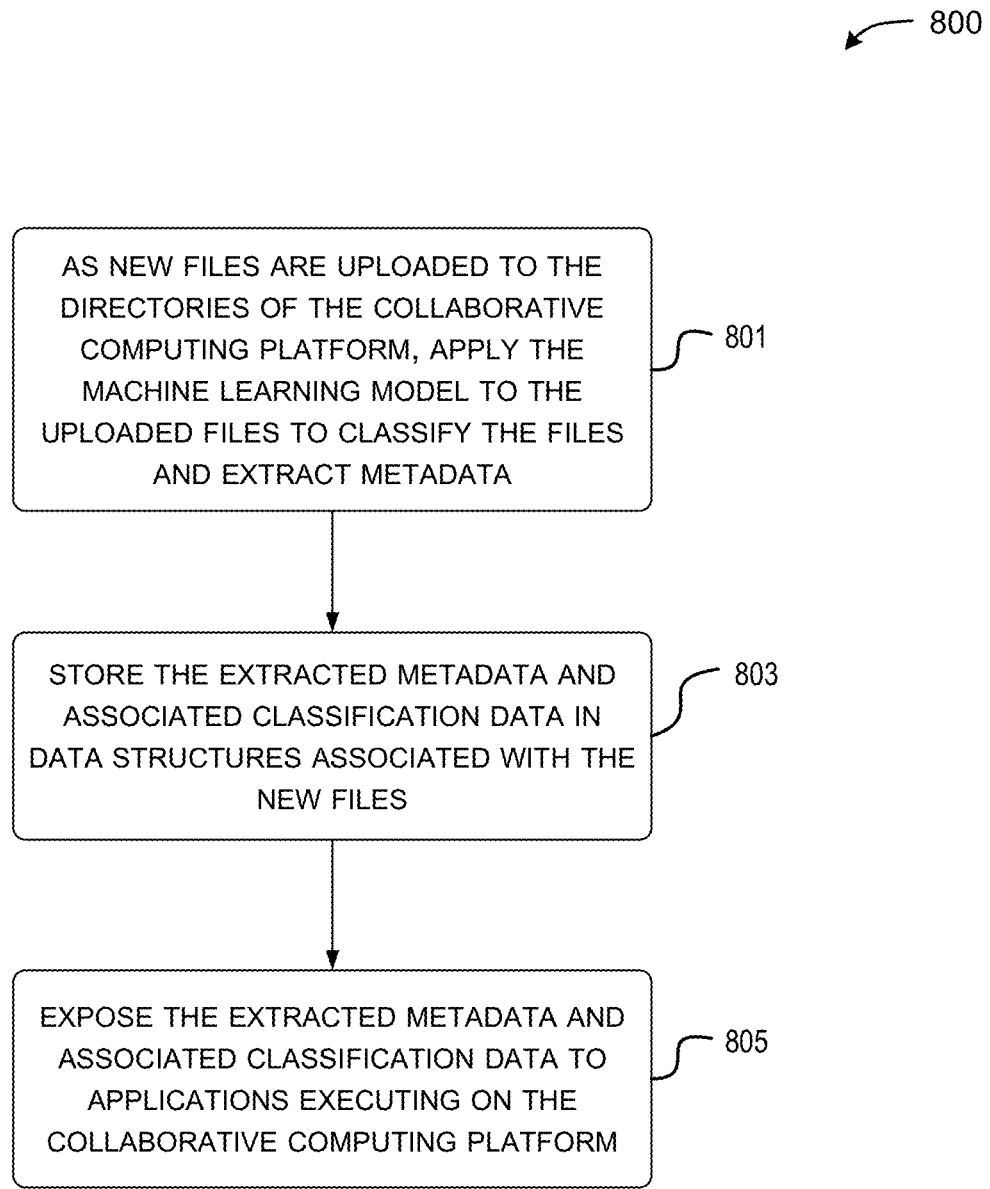
FIG. 8 illustrates aspects of a routine for enabling aspects of the techniques disclosed herein as shown and described below.

FIG. 8 illustrates aspects of a routine 800 for enabling aspects of the techniques disclosed herein as shown and described below. The operations in FIG. 8 can be performed, for example, by the computing device 900 of FIG. 9, as described above with respect to any one of FIGS. 1-6.

At operation 801, as new files are uploaded to directories of a collaborative computing platform, a machine learning model is applied to the uploaded files to classify the files and extract metadata.

At operation 803, the extracted metadata and associated classification data are stored in data structures associated with the new files. In an embodiment, the data structures are existing data structures of the collaborative computing platform.

At operation 805, the extracted metadata and associated classification data are exposed to applications executing on the collaborative computing platform.

FIG. 9 shows additional details of an example computer architecture 900 for a computer, such as a computing device executing computing platform 110, capable of executing the program components described herein. Thus, the computer architecture 900 illustrated in FIG. 9 illustrates an architecture for a server computer, a mobile phone, a PDA, a smart phone, a desktop computer, a netbook computer, a tablet computer, and/or a laptop computer. The computer architecture 900 may be utilized to execute any aspects of the software components presented herein.

The computer architecture 900 illustrated in FIG. 9 includes a central processing unit 902 ("CPU"), a system memory 904, including a random access memory 909 ("RAM") and a read-only memory ("ROM") 909, and a system bus 910 that couples the memory 904 to the CPU 902. A basic input/output system containing the basic routines that help to transfer information between elements within the computer architecture 900, such as during startup, is stored in the ROM 906. The computer architecture 900 further includes a mass storage device 912 for storing an operating system 907. Mass storage device 912 may further include machine teaching functionality 990 and collaboration platform 980, which include some or all of the aspects of functionality as disclosed herein.

The mass storage device 912 is connected to the CPU 902 through a mass storage controller (not shown) connected to the bus 910. The mass storage device 912 and its associated computer-readable media provide non-volatile storage for the computer architecture 900. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. For purposes of the claims, the phrase "computer storage medium," "computer-readable storage medium" and variations thereof, does not include waves, signals, and/or other transitory and/or intangible communication media, per se.

According to various configurations, the computer architecture 900 may operate in a networked environment using logical connections to remote computers through the network 910 and/or another network (not shown). The computer architecture 900 may connect to the network 910 through a network interface unit 914 connected to the bus 910. It should be appreciated that the network interface unit 914 also may be utilized to connect to other types of networks and remote computer systems. The computer architecture 900 also may include an input/output controller 913 for receiving and processing input from a number of other devices, including a keyboard, mouse, or electronic stylus (not shown in FIG. 9). Similarly, the input/output controller 913 may provide output to a display screen, a printer, or other type of output device (also not shown in FIG. 9).

It should be appreciated that the software components described herein may, when loaded into the CPU 902 and executed, transform the CPU 902 and the overall computer architecture 900 from a general-purpose computing system into a special-purpose computing system customized to facilitate the functionality presented herein. The CPU 902 may be constructed from any number of transistors or other discrete circuit elements, which may individually or collectively assume any number of states. More specifically, the CPU 902 may operate as a finite-state machine, in response to executable instructions contained within the software modules disclosed herein. These computer-executable instructions may transform the CPU 902 by specifying how the CPU 902 transitions between states, thereby transforming the transistors or other discrete hardware elements constituting the CPU 902.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, and/or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 900 in order to store and execute the software components presented herein. It also should be appreciated that the computer architecture 900 may include other types of computing devices, including hand-held computers, embedded computer systems, personal digital assistants, and other types of computing devices known to those skilled in the art. It is also contemplated that the computer architecture 900 may not include all of the components shown in FIG. 9, may include other components that are not explicitly shown in FIG. 9, or may utilize an architecture completely different than that shown in FIG. 9.

Figure 10:
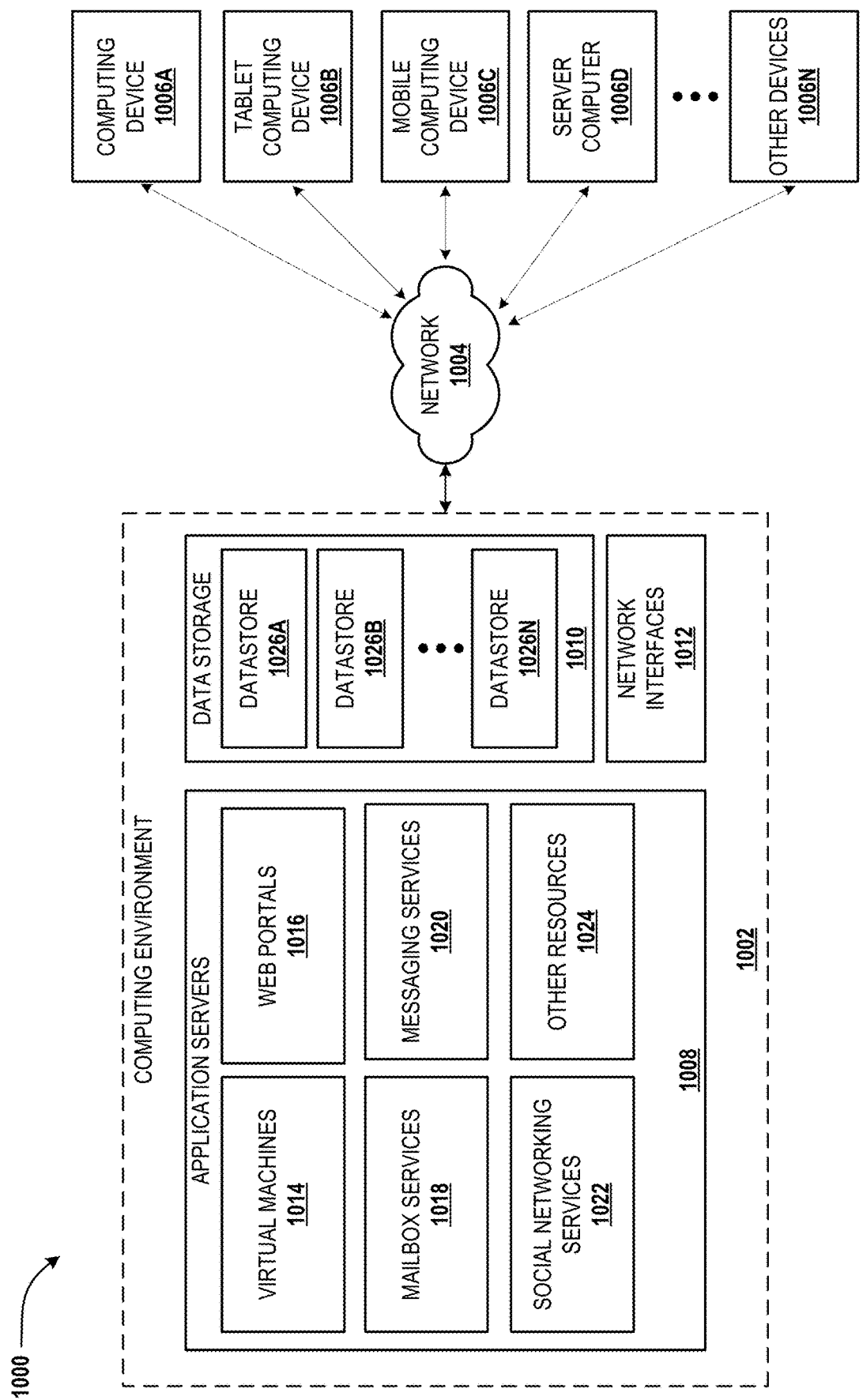
FIG. 10 is a computer architecture diagram illustrating an illustrative computer hardware and software architecture for a computing system capable of implementing aspects of the techniques and technologies presented herein.

FIG. 10 depicts an illustrative distributed computing environment 1000 capable of executing the software components described herein. Thus, the distributed computing environment 1000 illustrated in FIG. 10 can be utilized to execute any aspects of the software components presented herein. For example, the distributed computing environment 1000 can be utilized to execute aspects of the software components described herein.

According to various implementations, the distributed computing environment 1000 includes a computing environment 1002 operating on, in communication with, or as part of the network 1004. The network 1004 may be or may include the network 910, described above with reference to FIG. 9. The network 1004 also can include various access networks. One or more client devices 1006A-1006N (hereinafter referred to collectively and/or generically as "clients 1006" and also referred to herein as computing devices 106) can communicate with the computing environment 1002 via the network 1004 and/or other connections (not illustrated in FIG. 10). In one illustrated configuration, the clients 1006 include a computing device 1006A such as a laptop computer, a desktop computer, or other computing device; a slate or tablet computing device ("tablet computing device") 1006B; a mobile computing device 1006C such as a mobile telephone, a smart phone, or other mobile computing device; a server computer 1006D; and/or other devices 1006N. It should be understood that any number of clients 1006 can communicate with the computing environment 1002. Two example computing architectures for the clients 1006 are illustrated and described herein with reference to FIGS. 9 and 10. It should be understood that the illustrated clients 1006 and computing architectures illustrated and described herein are illustrative, and should not be construed as being limiting in any way.

In the illustrated configuration, the computing environment 1002 includes application servers 1008, data storage 1010, and one or more network interfaces 1012. According to various implementations, the functionality of the application servers 1008 can be provided by one or more server computers that are executing as part of, or in communication with, the network 1004. The application servers 1008 can host various services, virtual machines, portals, and/or other resources. In the illustrated configuration, the application servers 1008 host one or more virtual machines 1014 for hosting applications or other functionality. According to various implementations, the virtual machines 1014 host one or more applications and/or software modules for enabling in-application support for topological changes to files during remote synchronization. It should be understood that this configuration is illustrative, and should not be construed as being limiting in any way. The application servers 1008 also host or provide access to one or more portals, link pages, Web sites, and/or other information ("Web portals") 1016.

According to various implementations, the application servers 1008 also include one or more mailbox services 1018 and one or more messaging services 1020. The mailbox services 1018 can include electronic mail ("email") services. The mailbox services 1018 also can include various personal information management ("PIM") and presence services including, but not limited to, calendar services, contact management services, collaboration services, and/or other services. The messaging services 1020 can include, but are not limited to, instant messaging services, chat services, forum services, and/or other communication services.

The application servers 1008 also may include one or more social networking services 1022. The social networking services 1022 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 1022 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 1022 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 1022 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 1022 are not mentioned herein for the sake of brevity. As such, the above configurations are illustrative, and should not be construed as being limited in any way. According to various implementations, the social networking services 1022 may host one or more applications and/or software modules for providing the functionality described herein, such as enabling in-application support for topological changes to files during remote synchronization. For instance, any one of the application servers 1008 may communicate or facilitate the functionality and features described herein. For instance, a social networking application, mail client, messaging client or a browser running on a phone or any other client 1006 may communicate with a networking service 1022 and facilitate the functionality, even in part, described above with respect to FIG. 10. Any device or service depicted herein can be used as a resource for supplemental data, including email servers, storage servers, etc.

As shown in FIG. 10, the application servers 1008 also can host other services, applications, portals, and/or other resources ("other resources") 1024. The other resources 1024 can include, but are not limited to, document sharing, rendering or any other functionality. It thus can be appreciated that the computing environment 1002 can provide integration of the concepts and technologies disclosed herein with various mailbox, messaging, social networking, and/or other services or resources.

As mentioned above, the computing environment 1002 can include the data storage 1010. According to various implementations, the functionality of the data storage 1010 is provided by one or more databases operating on, or in communication with, the network 1004. The functionality of the data storage 1010 also can be provided by one or more server computers configured to host data for the computing environment 1002. The data storage 1010 can include, host, or provide one or more real or virtual datastores 1026A-1026N (hereinafter referred to collectively and/or generically as "datastores 1026"). The datastores 1026 are configured to host data used or created by the application servers 1008 and/or other data. Although not illustrated in FIG. 10, the datastores 1026 also can host or store web page documents, word documents, presentation documents, data structures, algorithms for execution by a recommendation engine, and/or other data utilized by any application program or another module. Aspects of the datastores 1026 may be associated with a service for storing files.

The computing environment 1002 can communicate with, or be accessed by, the network interfaces 1012. The network interfaces 1012 can include various types of network hardware and software for supporting communications between two or more computing devices including, but not limited to, the computing devices and the servers. It should be appreciated that the network interfaces 1012 also may be utilized to connect to other types of networks and/or computer systems.

It should be understood that the distributed computing environment 1000 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1000 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1000 to utilize the functionality described herein for providing the techniques disclosed herein, among other aspects. In one specific example, as summarized above, techniques described herein may be implemented, at least in part, by a web browser application, which works in conjunction with the application servers 1008 of FIG. 10.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

The disclosure presented herein encompasses the subject matter set forth in the following example clauses.

Example 1: A method for configuring a machine learning model, the method comprising:
instantiating a user interface configured to communicate with a machine learning model hosted on a collaborative computing platform;
receiving, via the user interface, a selection of a file for input to the machine learning model, wherein the file is stored on the collaborative computing platform;
receiving, via an interactive area on the user interface, a selection of content in the file for input to the machine learning model;
receiving, via the interactive area, one or more instructions for applying the selected content to the machine learning model;
communicating, by the user interface to the machine learning model, data indicative of the selected file, selected content, and instructions;
rendering, on the user interface, a first option to enter additional inputs to the machine learning model and a second option to publish the machine learning model;
in response to selection of the first option, receiving, by the user interface, additional inputs to the machine learning model; and
in response to selection of the second option:
receiving an indication of a file of the collaborative computing platform to be processed by the machine learning model; and
sending an instruction to the machine learning model to apply the machine learning model to the indicated file;
wherein the machine learning model is trained using the selected file, selected content, and instructions; and the trained machine learning model is operable to generate outputs based on the indicated file as input data.

Example 2: The method of example 1, wherein the machine learning model implements a machine teaching paradigm.

Example 3: The method of example 1, wherein the files comprise documents containing text.

Example 4: The method of example 1, wherein the interactive area is configured to allow a user to highlight selected text as input to the machine learning model and define explanations for how to apply the selected text.

Example 5: The method of example 1, wherein publishing the machine learning model comprises applying the machine learning model to files that are stored in selected directories and files that are added to the selected directories.

The method of example 1, further comprising:
rendering, on the user interface, a third option to test the machine learning model; and
in response to selection of the third option, sending an instruction to apply the machine learning model to selected files.

Example 7: The method of example 1, further comprising rendering, on the user interface, a confidence level for the machine learning model.

Example 8: The method of example 1, wherein the interactive area is configured to allow a user to enter corrections to previously entered input to the machine learning model.

Example 9: A computing device comprising:
one or more processors;
a memory in communication with the one or more processors, the memory having computer-readable instructions stored thereupon which, when executed by the one or more processors, cause the computing device to:
instantiate a user interface configured to communicate with a machine learning model hosted on a collaborative computing platform;
receive, via the user interface, a selection of one or more files for input to the machine learning model, wherein the files are stored on the collaborative computing platform;
receive, via an interactive area on the user interface, selections of content in the files for input to the machine learning model;
receive, via the interactive area, one or more instructions for applying the selected content to the machine learning model;
communicate, to the machine learning model, data indicative of the selected files, selected content, and instructions;
in response to selection of an option to publish the machine learning model:
receiving a selection of a file of the collaborative computing platform; and
sending an instruction to the machine learning model to apply the machine learning model to the selected file;
wherein the machine learning model is trained using the selected files, selected content, and instructions; and the trained machine learning model is operable to generate outputs based on the selected file as input data.

Example 10: The computing device of example 9, wherein the machine learning model implements a machine teaching paradigm.

Example 11: The computing device of example 9, wherein the interactive area is configured to allow a user to highlight selected text as input to the machine learning model and define explanations for how to apply the selected text.

Example 12: The computing device of example 9, wherein publishing the machine learning model comprises applying the machine learning model to files that are stored in selected directories and files that are added to the selected directories.

Example 13: The computing device of example 9, further comprising computer-readable instructions stored thereupon which, when executed by the one or more processors, cause the computing device to:
render, on the user interface, an option to test the machine learning model; and
in response to selection of the option to test the machine learning model, send an instruction to apply the machine learning model to selected files.

Example 14: The computing device of example 9, further comprising computer-readable instructions stored thereupon which, when executed by the one or more processors, cause the computing device to:
render, on the user interface, a confidence level for the machine learning model.

Example 15: The computing device of example 9, wherein the interactive area is configured to allow a user to enter corrections to previously entered input to the machine learning model.

Example 16: One or more non-transitory computer-readable media storing computer-executable instructions that, upon execution cause one or more processors of a computing device to cause the computing device to perform operations comprising:
  receiving, via a user interface configured to communicate with a machine learning model hosted on a collaborative computing platform, a selection of one or more files for input to the machine learning model, wherein the files are stored on the collaborative computing platform;
  receive, via an interactive area on the user interface, selections of content in the files for input to the machine learning model;
  receive, via the interactive area, one or more instructions for applying the selected content to the machine learning model;
  communicate, to the machine learning model, data indicative of the selected files, selected content, and instructions;
  in response to selection of an option to publish the machine learning model:
    receiving a selection of one or more directories of the collaborative computing platform; and
    sending an instruction to the machine learning model to apply the machine learning model to the selected directories;
  wherein the machine learning model is trained using the selected files, selected content, and instructions; and the trained machine learning model is operable to generate outputs based on the selected directories as input data.

Example 17: The non-transitory computer-readable media of example 16 further comprising computer-executable instructions that, upon execution cause one or more processors of a computing device to cause the computing device to perform operations comprising:
render, on the user interface, an option to test the machine learning model; and
in response to selection of the option to test the machine learning model, send an instruction to apply the machine learning model to selected files.

Example 18: The non-transitory computer-readable media of example 16, wherein the interactive area is configured to allow a user to highlight selected text as input to the machine learning model and define explanations for how to apply the selected text.

Example 19: The non-transitory computer-readable media of example 16, wherein publishing the machine learning model comprises applying the machine learning model to files that are stored in the selected directories and files that are added to the selected directories.

Example 20: The non-transitory computer-readable media of example 16, wherein the interactive area is configured to allow a user to enter corrections to previously entered input to the machine learning model.

The disclosure presented herein encompasses the subject matter set forth in the following example clauses.

The disclosure presented herein encompasses the subject matter set forth in the following example clauses.

Example 1: A method for integrating a machine learning model with a collaborative computing platform, the method comprising:
  receiving, via a user interface configured to communicate with the machine learning model, a selection of one or more files for input to the machine learning model, wherein the files are stored on the collaborative computing platform;
  receiving, via the user interface, a selection of content in the files for input to the machine learning model, and one or more instructions for applying the selected content to the machine learning model;
  receiving a selection of one or more directories of the collaborative computing platform;
  in response to receiving an instruction to apply the machine learning model to the selected directories:
    as new files are uploaded to the selected directories of the collaborative computing platform, applying the machine learning model to the uploaded files to classify the files and extract metadata;
    storing the extracted metadata and associated classification data in data structures associated with the new files, wherein the data structures are existing data structures of the collaborative computing platform; and
    exposing the extracted metadata and associated classification data to applications executing on the collaborative computing platform;
  wherein the machine learning model is trained using the selected files, selected content, and instructions; and the trained machine learning model is operable to generate outputs based on the selected directories as input data.

Example 2: The method of example 1, wherein the machine learning model implements a machine teaching paradigm.

Example 3: The method of example 1, wherein the files comprise documents containing text.

Example 4: The method of example 1, wherein the selected directories are libraries configured to host files associated with selected users of the collaborative computing platform.

Example 5: The method of example 1, further comprising compiling the extracted metadata and associated classification data to maintain running statistics for the selected directories.

Example 6: The method of example 4, wherein the data structures comprise columns of the libraries.

Example 7: The method of example 1, wherein the applications comprise one or more of data discovery, business process, or compliance applications.

Example 8: The method of example 1, wherein the metadata comprises one or more of model, label, feature, or schema.

Example 9: A computing device comprising:
one or more processors;
a memory in communication with the one or more processors, the memory having computer-readable instructions stored thereupon which, when executed by the one or more processors, cause the computing device to:
in response to receiving an instruction to apply a machine learning model to one or more directories of a collaborative computing platform:
as new files are uploaded to the directories of the collaborative computing platform, apply the machine learning model to the uploaded files to classify the files and extract metadata;
store the extracted metadata and associated classification data in data structures associated with the new files, wherein the data structures are existing data structures of the collaborative computing platform; and
expose the extracted metadata and associated classification data to applications executing on the collaborative computing platform;
wherein the machine learning model is trained using selected files stored on the collaborative computing platform; and the trained machine learning model is operable to generate outputs based on the selected files as input data.

Example 10: The computing device of example 9, wherein the machine learning model implements a machine teaching paradigm.

Example 11: The computing device of example 9, wherein the directories are libraries configured to host files associated with selected users of the collaborative computing platform.

Example 12: The computing device of example 9, further comprising computer-readable instructions stored thereupon which, when executed by the one or more processors, cause the computing device to:
compile the extracted metadata and associated classification data to maintain running statistics for the directories.

Example 13: The computing device of example 11, wherein the data structures comprise columns of the libraries.

Example 14: The computing device of example 9, wherein the applications comprise one or more of data discovery, business process, or compliance applications.

Example 15: The computing device of example 9, wherein the metadata comprises one or more of model, label, feature, or schema.

Example 16: One or more non-transitory computer-readable media storing computer-executable instructions that, upon execution cause one or more processors of a computing device to cause the computing device to perform operations comprising:
receiving a selection of one or more files for input to a machine learning model integrated with a collaborative computing platform, wherein the files are stored on the collaborative computing platform;
receiving a selection of content in the files for input to the machine learning model, and one or more instructions for applying the selected content to the machine learning model;
receiving a selection of one or more directories of the collaborative computing platform;
in response to receiving an instruction to apply the machine learning model to the selected directories:
applying the machine learning model to files that are uploaded to the selected directories to classify the files and extract metadata;
storing the extracted metadata and associated classification data in data structures associated with the uploaded files, wherein the data structures are data structures of the collaborative computing platform; and
exposing the extracted metadata and associated classification data to applications executing on the collaborative computing platform;
wherein the machine learning model is trained using the selected files, selected content, and instructions; and the trained machine learning model is operable to generate outputs based on the selected directories as input data.

Example 17: The non-transitory computer-readable media of example 16 further comprising computer-executable instructions that, upon execution cause one or more processors of a computing device to cause the computing device to perform operations comprising:
compiling the extracted metadata and associated classification data to maintain running statistics for the selected directories.

Example 18: The non-transitory computer-readable media of example 16, wherein the selected directories are libraries configured to host files associated with selected users of the collaborative computing platform.

Example 19: The non-transitory computer-readable media of example 16, wherein the applications comprise one or more of data discovery, business process, or compliance applications.

Example 20: The non-transitory computer-readable media of example 16, wherein the metadata comprises one or more of model, label, feature, or schema.

What is claimed is:

1. A method for integrating a machine learning model with a collaborative computing platform, the method comprising:
receiving, via a user interface configured to communicate with the machine learning model, a selection of one or more files for input to the machine learning model, wherein the files are stored on the collaborative computing platform;
receiving, via the user interface, a selection of content in the files for input to the machine learning model, and one or more instructions for applying the selected content to the machine learning model;
receiving a selection of one or more directories of the collaborative computing platform;
in response to receiving an instruction to apply the machine learning model to the selected directories:
as new files are uploaded to the selected directories of the collaborative computing platform, applying the machine learning model to the uploaded files to classify the files and extract metadata;
storing the extracted metadata and associated classification data in data structures associated with the new files, wherein the data structures are existing data structures of the collaborative computing platform; and
exposing the extracted metadata and associated classification data to applications executing on the collaborative computing platform;
wherein the machine learning model is trained using the selected files, selected content, and instructions; and the trained machine learning model is operable to generate outputs based on the selected directories as input data.

2. The method of claim 1, wherein the machine learning model implements a machine teaching paradigm.

3. The method of claim 1, wherein the files comprise documents containing text.

4. The method of claim 1, wherein the selected directories are libraries configured to host files associated with selected users of the collaborative computing platform.

5. The method of claim 1, further comprising compiling the extracted metadata and associated classification data to maintain running statistics for the selected directories.

6. The method of claim 4, wherein the data structures comprise columns of the libraries.

7. The method of claim 1, wherein the applications comprise one or more of data discovery, business process, or compliance applications.

8. The method of claim 1, wherein the metadata comprises one or more of model, label, feature, or schema.

9. A computing device comprising:
one or more processors;
a memory in communication with the one or more processors, the memory having computer-readable instructions stored thereupon which, when executed by the one or more processors, cause the computing device to:
in response to receiving an instruction to apply a machine learning model to one or more directories of a collaborative computing platform:
as new files are uploaded to the directories of the collaborative computing platform, apply the machine learning model to the uploaded files to classify the files and extract metadata;
store the extracted metadata and associated classification data in data structures associated with the new files, wherein the data structures are existing data structures of the collaborative computing platform; and
expose the extracted metadata and associated classification data to applications executing on the collaborative computing platform;
wherein the machine learning model is trained using selected files stored on the collaborative computing platform; and the trained machine learning model is operable to generate outputs based on the selected files as input data.

10. The computing device of claim 9, wherein the machine learning model implements a machine teaching paradigm.

11. The computing device of claim 9, wherein the directories are libraries configured to host files associated with selected users of the collaborative computing platform.

12. The computing device of claim 9, further comprising computer-readable instructions stored thereupon which, when executed by the one or more processors, cause the computing device to:
compile the extracted metadata and associated classification data to maintain running statistics for the directories.

13. The computing device of claim 11, wherein the data structures comprise columns of the libraries.

14. The computing device of claim 9, wherein the applications comprise one or more of data discovery, business process, or compliance applications.

15. The computing device of claim 9, wherein the metadata comprises one or more of model, label, feature, or schema.

16. One or more non-transitory computer-readable media storing computer-executable instructions that, upon execution cause one or more processors of a computing device to cause the computing device to perform operations comprising:
receiving a selection of one or more files for input to a machine learning model integrated with a collaborative computing platform, wherein the files are stored on the collaborative computing platform;
receiving a selection of content in the files for input to the machine learning model, and one or more instructions for applying the selected content to the machine learning model;
receiving a selection of one or more directories of the collaborative computing platform;
in response to receiving an instruction to apply the machine learning model to the selected directories:
applying the machine learning model to files that are uploaded to the selected directories to classify the files and extract metadata;
storing the extracted metadata and associated classification data in data structures associated with the uploaded files, wherein the data structures are data structures of the collaborative computing platform; and
exposing the extracted metadata and associated classification data to applications executing on the collaborative computing platform;
wherein the machine learning model is trained using the selected files, selected content, and instructions; and the trained machine learning model is operable to generate outputs based on the selected directories as input data.

17. The non-transitory computer-readable media of claim 16 further comprising computer-executable instructions that, upon execution cause one or more processors of a computing device to cause the computing device to perform operations comprising:
compiling the extracted metadata and associated classification data to maintain running statistics for the selected directories.

18. The non-transitory computer-readable media of claim 16, wherein the selected directories are libraries configured to host files associated with selected users of the collaborative computing platform.

19. The non-transitory computer-readable media of claim 16, wherein the applications comprise one or more of data discovery, business process, or compliance applications.

20. The non-transitory computer-readable media of claim 16, wherein the metadata comprises one or more of model, label, feature, or schema.

* * * * *